United States Patent [19]

Sato

[11] Patent Number: 5,033,694
[45] Date of Patent: Jul. 23, 1991

[54] ATTITUDE CONTROL DEVICE FOR AIR OR SEA TRANSPORTATION CRAFT

[75] Inventor: Hiroshi Sato, Fujisawa, Japan

[73] Assignee: Daiichi Electric Kabushiki Kaisha, Kanagawa, Japan

[21] Appl. No.: 404,448

[22] Filed: Sep. 8, 1989

[51] Int. Cl.⁵ .............................................. B64C 13/36
[52] U.S. Cl. ..................... 244/78; 244/194; 244/226; 244/227; 60/432
[58] Field of Search ................. 244/78, 226, 227, 194, 244/195, 75 R; 60/432, 433

[56] References Cited

U.S. PATENT DOCUMENTS

| | | | |
|---|---|---|---|
| 3,157,994 | 11/1964 | Brand | 60/432 |
| 3,379,951 | 4/1968 | Franchi et al. | 244/194 |
| 3,529,704 | 9/1970 | Winstone et al. | 244/194 |
| 3,679,156 | 7/1972 | Redmond, Jr. | 244/78 |
| 3,817,480 | 6/1974 | Ringwall | 244/78 |
| 3,960,348 | 6/1976 | Fowler et al. | 244/78 |
| 4,055,135 | 10/1977 | Wesner | 244/194 |
| 4,079,906 | 3/1978 | Durandeau et al. | 244/194 |

Primary Examiner—Joseph F. Peters, Jr.
Assistant Examiner—Christopher P. Ellis
Attorney, Agent, or Firm—Wenderoth, Lind & Ponack

[57] ABSTRACT

An attitude control system for controlling a plurality of attitude control devices, which cooperate to establish the attitude of a vehicle includes redundant control units for outputting attitude control signals to each of the attitude control devices. Additionally, a plurality of discreet power servo units are provided which are located in proximity to and operatively connected to the plurality of attitude control devices. The redundant control units and the plurality of discreet power servo units are connected electrically and/or optically. Each of the discreet power servo units includes an adder for adding an attitude control signal and a positional feed back signal, a rotational drive source for providing a rotational motion in response to the output from the adder, a fluid pressure circuit for hydraulically driving an attitude control device coupled thereto, and a sensor for sensing the position of the attitude control device coupled thereto and for providing to the adder the positive feed back signal.

20 Claims, 4 Drawing Sheets

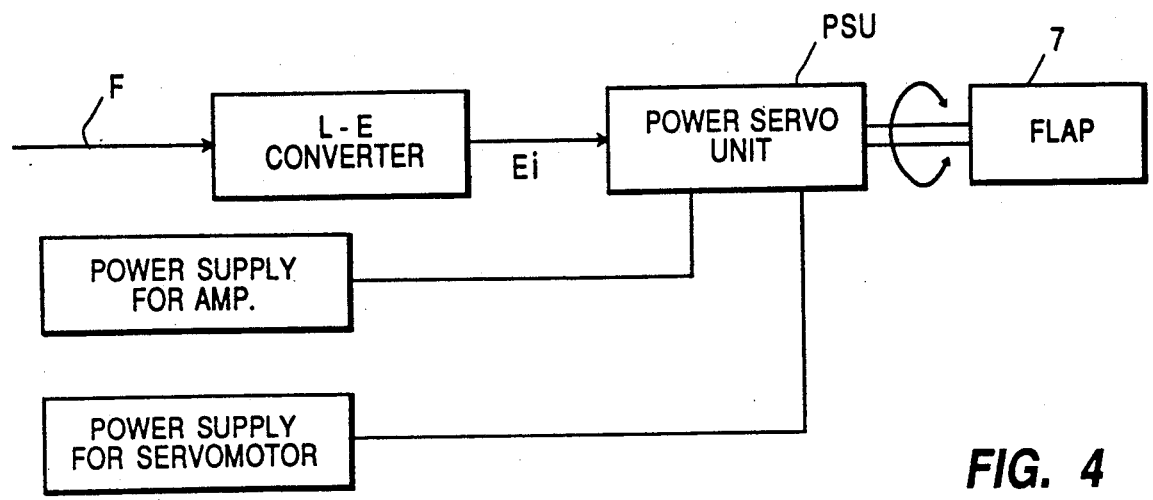
FIG. 4
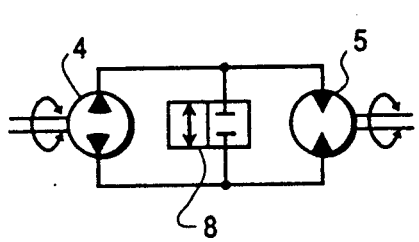
FIG. 5
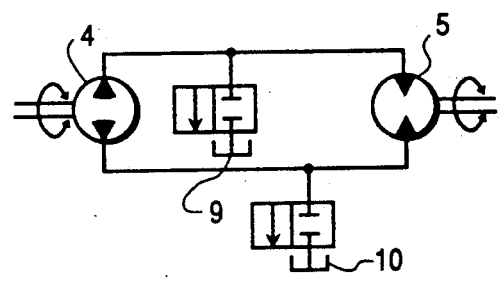
FIG. 6
FIG. 7
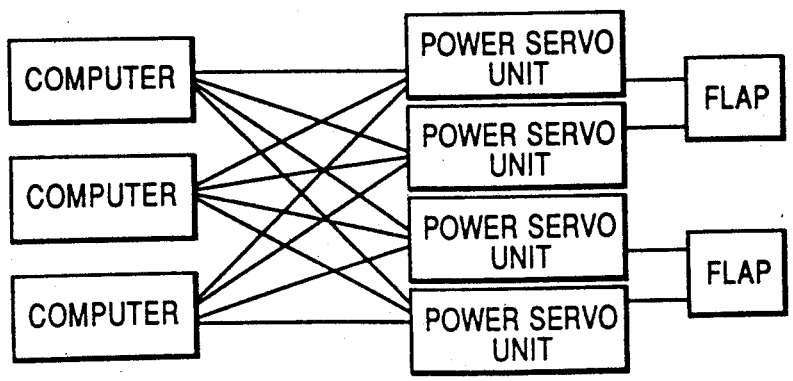

ATTITUDE CONTROL DEVICE FOR AIR OR SEA TRANSPORTATION CRAFT

BACKGROUND OF THE INVENTION

1. Field of the Invention

This invention relates, in a broad sense, to an attitude control device for a transportation vehicle, such as an air craft or the like, and more particularly to an attitude control device for an air or sea transportation vehicle, such as an air craft or the like, in which a servo-motor and a fluid pressure pump are used and controlled electronically.

Specifically, a first aspect of the invention relates to an attitude control device adapted to control the flaps of an air craft, a second aspect of the invention relates to an attitude control device adapted to control a link mechanism of a rotor of a helicopter, and a third aspect of the invention relates to an attitude control device adapted to control a rudder of a marine vessel.

2. Brief Description of the Prior Art

In order to control pitch, yaw, roll, etc. using rudder, elevator, aileron, etc., a wire is used in small air crafts, but a hydraulic system is employed for all large air crafts. At present, as the supersonic air craft appears in use, control circuitry having a very quick response is required. To this end, a hydraulic control system using a servo valve occupies the main stream usage.

Such an actuator control system using the servo valve is extremely inefficient, i.e. about 15~30% efficient. For an air craft, efforts have been successful for reducing the body weight and for improving the engine efficiency. However, regarding attitude control, it seems that since the advantages of the fluid pressure system are so valuable and the response of the servo valve is so excellent, the bad efficiency is disregarded. Also, in the conventional device, fluid pipings are disposed throughout the air craft, which is far from a fuel safe concept.

As seen from the perspective view of an air craft of FIG. 2, distributed control is performed by providing an actuator for each flap. Even if the fluid piping is dispersed in the best possible manner, there still remains a disadvantage in that the entire hydraulic pressure of the particular system is lowered when one piping is cut, as long as the pump system is collectively arranged as one group. In fact, a large passenger air craft was recently disabled due to a lowered hydraulic pressure caused by a breakage of the fluid piping of the control system, which in turn was caused by the destruction of the pressure partition.

SUMMARY OF THE INVENTION

In view of the above, an attitude control device for an air or sea transportation vehicle, such as an air craft or the like, according to the present invention is designed as such that a servo-motor is driven by an electronic control, a fluid pressure pump is driven by the servo-motor, an actuator is actuated by the fluid pressure pump, an attitude control device is actuated by the actuator, the angle of the attitude control device is converted to an electric signal, and then the electric signal is fed back to the electronic control.

The specific construction of the attitude control device for an air or sea transportation vehicle, such as an air craft or the like, according to the present invention will be described in detail.

The first aspect of the invention will be described. There is provided an adder. This adder has a control signal input thereto and a feed back signal input thereto as will be described. There is also provided an electric rotation controller. This electric rotation controller has input thereto an output from the adder. There is further provided a rotational drive source. This rotational drive source is controlled by the electric rotation controller. Furthermore, there is provided a two-way type fluid pressure pump. This two-way type fluid pressure pump is rotated by the rotational drive source. Instead of this two-way type fluid pressure pump, there may be provided a one-way type fluid pressure pump and a fluid flowing direction switching valve controlled by the electric rotation controller.

Furthermore, there is provided a fluid pressure actuator, such as a hydraulic motor. This fluid pressure actuator is actuated by a fluid received from the fluid flowing direction a switching valve or the two-way fluid pressure motor.

There is also provided a flap of an air craft. This flap is actuated by the fluid pressure actuator. Lastly, there is provided a rotational angle sensor. This rotational angle sensor is adapted to detect the rotational angle of the flap and to feed a detection signal back to the adder.

The attitude control device having the above-mentioned construction is provided for each flap to control the attitude of the air craft.

The second aspect of the invention will now be described. There is provided an adder. This adder has a control signal input thereto and a feed back signal input thereto as will be described. There is also provided an electric rotation controller. This electric rotation controller has input thereto an output from the adder. There is further provided a rotational drive source. This rotational drive source is controlled by the electric rotation controller. Furthermore, there is provided a two-way type fluid pressure pump. This two-way type fluid pressure pump is rotated by the rotational drive source. Instead of this two-way type fluid pressure pump, there may be provided a one-way type fluid pressure pump and a fluid flowing direction switching valve controlled by the electric rotation controller.

Furthermore, there is provided a fluid pressure actuator, such as a hydraulic cylinder. This fluid pressure actuator is actuated by a fluid from the fluid flowing direction switching valve or the two-way type fluid pressure motor.

There is also provided a link mechanism of a rotor of a helicopter. This link mechanism of the rotor of the helicopter is actuated by the fluid pressure actuator. Lastly, there is provided an inclination angle sensor. This inclination angle sensor is adapted to detect the angle of inclination of the link mechanism of the rotor and to feed a detection signal back to the adder.

The attitude control device for a helicopter having the above-mentioned construction is provided in two sets as a group, and is adapted to incline the link mechanism of the rotor of the helicopter in the X-axis and Y-axis directions.

The third aspect of the invention will now be described. There is provided an adder. This adder has a control signal input thereto and a feed back signal input thereto as will be described. There is further provided an electric rotation controller. This electric rotation controller has input thereto an output from the adder. There is also provided a rotational drive source. This rotational drive source is controlled by the electric rotation controller. Furthermore, there is provided a two-way fluid pressure pump. This two-way type fluid pressure pump is rotated by the rotational drive source. Instead of this two-way type fluid pressure pump, there may be provided a one-way type fluid pressure pump and a fluid flowing direction switching valve controlled by the electric rotation controller.

Furthermore, there is provided a fluid pressure actuator, such as a hydraulic cylinder. This fluid pressure actuator is actuated by a fluid coming from the fluid flowing direction switching valve or the two-way type fluid pressure pump.

There is also provided a rudder of a marine vessel. This rudder of a marine vessel is actuated by the fluid pressure actuator. Lastly, there is provided a rotational angle sensor. This rotational angle sensor is adapted to detect the angle of rotation of the rudder or fin of a marine vessel and to feed a detection signal back to the adder.

BRIEF DESCRIPTION OF THE DRAWINGS

FIG. 4 is a block diagram of one embodiment, in which a power servo unit includes a photo-electric converter and an optical fiber is used instead of electric wiring;

FIG. 5 is a hydraulic circuit diagram showing the vicinity of one set of a hydraulic pump and a hydraulic motor according to one embodiment of the present invention wherein a plurality of power servo units are arranged in a parallel relation for each flap;

FIG. 6 is a hydraulic circuit diagram showing the vicinity of one set of a hydraulic pump and a hydraulic motor according to another embodiment of the invention wherein a plurality of power servo units are arranged in a parallel relation for each flap;

FIG. 7 is a block diagram showing one example combining of a plurality of computers and plurality of power servo units;

FIGS. 10a and 10b are illustrations of a marine vessel including means for preventing rolling and pitching, wherein FIG. 10a is a side view thereof and FIG. 10b is a rear view thereof;

DETAILED DESCRIPTION OF THE EMBODIMENTS

The embodiments of an attitude control device for an air or sea transportation vehicle, such as an air craft or the like, will be described in detail with reference to the accompanying drawings.

Figure 1:
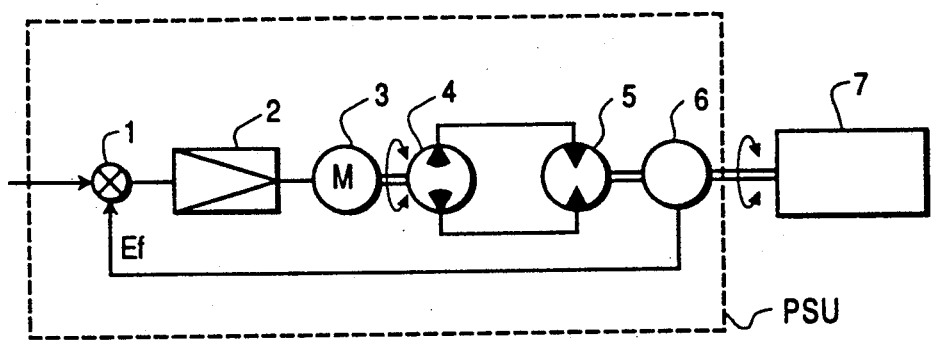
FIG. 1 is a schematic view showing the construction of an attitude control device for an air craft according to one embodiment of the present invention.

FIG. 1 is a schematic view showing the construction of an attitude control device for an air craft according to one embodiment of the present invention. The attitude control device according to this embodiment, as shown in FIG. 1, includes an adder 1, a servo-amplifier 2, a servo-motor 3, a hydraulic pump 4, a hydraulic motor 5, and a rotational angle sensor 6, whereby an output of the rotational angle sensor 6 is fed back to the adder in order to obtain a power output proportional to an input.

The adder 1 has input thereto a control signal input Ei for controlling the attitude of an air craft and a feedback signal input Ef as will be described. The servo-amplifier 2 is adapted to receive and amplify the output of the adder 1. The servo-motor 3 is rotatable in the normal and reverse directions. The rotational direction, speed, and start and stop of the servo-motor 3 are controlled by the output of the servo-amplifier 2. As the hydraulic pump 4 is directly connected with the servo-motor 3, the hydraulic pump 4 is rotated in the normal or reverse direction, is controlled in speed , and is started or stopped in accordance with the rotation of the servo-motor 3.

As the hydraulic motor 5 is actuated by the output of the hydraulic pump 4, the motor 5 is rotated in the normal or reverse direction, is controlled in speed, and is started or stopped in accordance with the rotation of the hydraulic pump 4.

Furthermore, there is provided a flap 7 of the air craft. The flap 7 is actuated by the hydraulic motor 5. Accordingly, the flap 7 is rotated in the normal or reverse direction, is controlled in speed, and is started or stopped in accordance with the rotation of the hydraulic motor 5. Lastly, there is provided a rotational angle sensor 6. The sensor 6 is adapted to detect the angle of rotation of the flap 7 for feed back to the adder 1.

Figure 2:
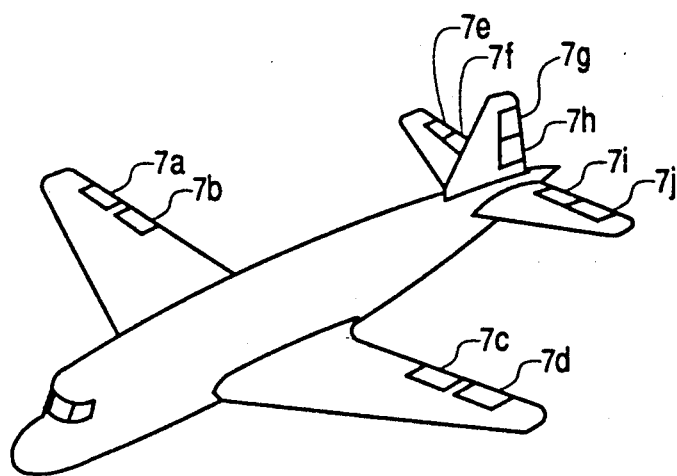
FIG. 2 is a perspective view showing an air craft and flaps thereof.

The above-mentioned construction is available for each of the flaps 7a through 7j shown in FIG. 2.

Figure 3:
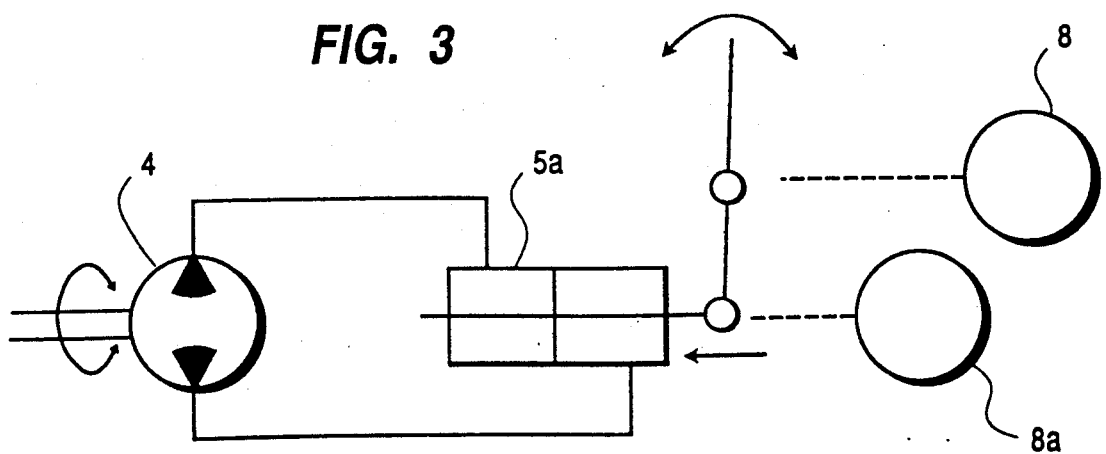
FIG. 3 is a circuit diagram showing the vicinity of an actuator according to another embodiment.

As another embodiment, instead of the hydraulic motor 5 and the angle sensor 6, there may be used, as shown in FIG. 3, a linear action cylinder 5a, a displacement sensor 6a, and a means 8 for converting linear movement into a rotational motion.

If the combination (excluding the flap) as shown in FIG. 1 or FIG. 3 is integrated, the entirety can be regarded as one actuator which is actuated in response to an electric signal. Accordingly, hereinafter such a combination is referred to as power servo unit "PSU". One PSU or a plurality of dispersed PSUs may be coupled to a single flap and remotely controlled in response to an electric signal.

A photo-electric converter may be added at the input of the power servo unit PSU as shown in FIG. 4, and remote control can be performed by generating light pulses on an optical fiber F. Additionally, wiring for providing an electric power source for the amplifier and the wiring for providing a servo motor electric power source are required. However, such wiring may be commonly provided instead of separately provided. Since such electric wiring is equipped for the purpose of providing electric power, it is hardly affected by external noise. If a signal input to the PSU, which is otherwise sensitive to external noise, is performed by means of optical communication, the reliability of the PSU is significantly increased.

As described above, a plurality actuators are mounted with respect to a single flap 7. By virtue of the foregoing arrangement, even when one power servo unit is out of order, operation will still be possible as long as the other power servo unit operates normally. In this situation, however, the inoperative servo unit acts as a brake, and it is desirable that oil is bypassed by the bypass valve 8 of FIG. 5 or discharged into the tanks 9 and 10 as shown in FIG. 6. In this case, the plurality of power servo units PSU may be arranged, rather than in parallel, where one is activated and the remainder kept on standby.

In general, an air craft is usually equipped with a plurality of redundant controlling computers for the sake of safety. In this case, it is preferable that, as shown in FIG. 7, each computer and power servo unit are optically or electrically interconnected by a signal conductor in order to from a network. Due to the foregoing arrangement, even when one computer or power servo unit is out of order, the other computers or power servo units are immediately actuated. Therefore, unless all signal conductors are cut, the flight can be continued.

Figure 8:
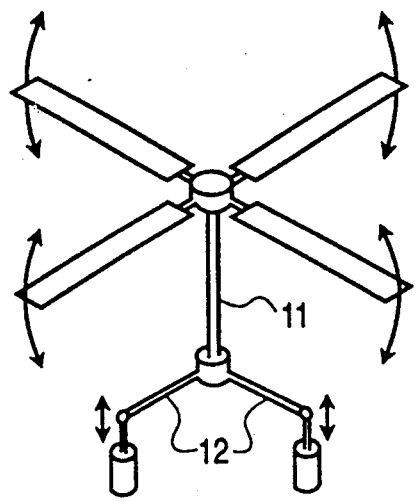
FIG. 8 is a schematic perspective view showing the vicinity of a rotor according to one embodiment of the invention in which the invention is applied to a helicopter.
Figure 9:
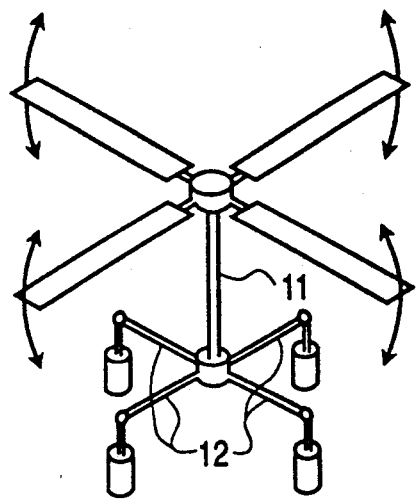
FIG. 9 is a schematic perspective view showing the vicinity of a rotor according to another embodiment of the invention in which the invention is applied to a helicopter.

It is also possible to use two such power servo units to control the rotor 11 of a helicopter in the X-axis and Y-axis directions. In this case, as shown in FIG. 8, power servo units having linear operation cylinders may be connected via a link mechanism 12 for control or as shown in FIG. 9, two cylinders may be connected with one axis in order to perform a push-pull operation using one power servo unit. In this way, the advancing direction of the flight can be controlled.

Although the description thus far has been limited to an air craft in order to facilitate the explanation of the present invention, the attitude control device can also be applied to the control of a marine vessel. That is, the present invention as described above with respect to an air craft is also applicable to a marine vessel.

The attitude control of a marine vessel is not limited to controlling the direction of the marine vessel, but also applicable to controlling the roll and pitch of the marine vessel (the term "attitude" denotes "inclination" and/or "direction"). The attitude control of a marine vessel is somewhat different than the attitude control of an air craft or the like. The attitude control of a marine vessel primarily aims at preventing the occurrence of rolling and pitching caused by waves so as to maintain a horizontal state of the marine vessel.

Figure 10A:
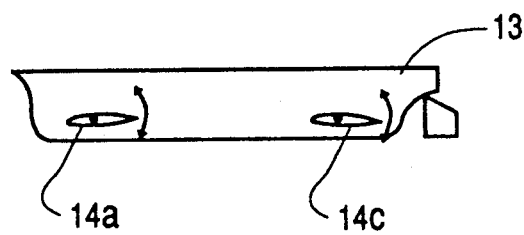
Figure 10B:
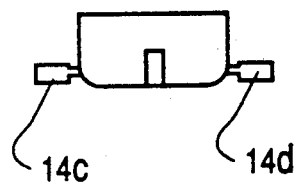
Figure 11:
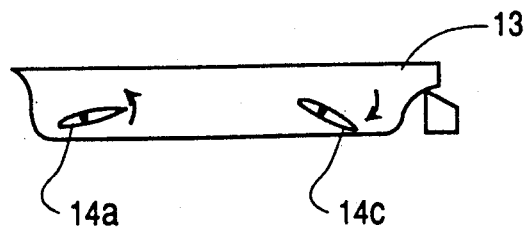
FIG. 11 is a side view of the marine vessel of FIG. 10.
Figure 12:
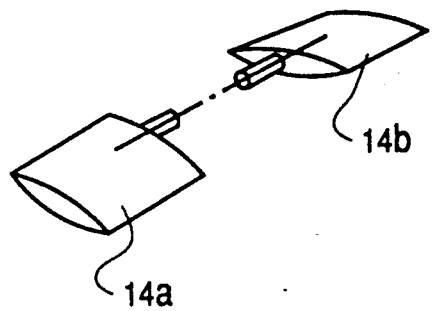
FIG. 12 is likewise a side view of the marine vessel of FIG. 10.
Figure 13:
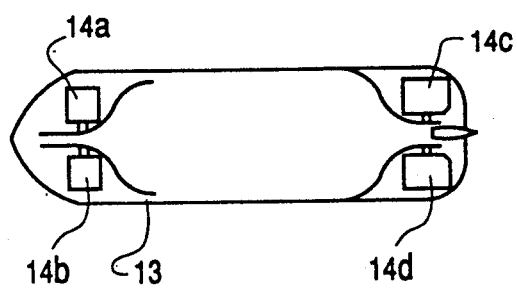
FIG. 13 shows another embodiment for mounting a fin.
Figure 14:
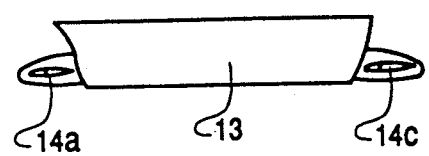
FIG. 14 shows a further embodiment for mounting a fin.
Figure 15:
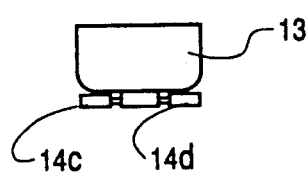
FIG. 15 shows a further embodiment for mounting a fin.

This aim can be achieved by providing fins 14a through 14d at the right and left sides, in the vicinity of the bow and stern, of the marine vessel 13, respectively, as shown in FIG. 10a and FIG. 10b. In this way, by moving the front and rear fins 14a and 14c, and 14b and 14d in the reverse directions respectively as shown in FIG. 11, pitching can be prevented. On the other hand, by moving the right and left fins 14a and 14b, and 14c and 14d in the reverse directions as shown in FIG. 12, rolling can be prevented. The fin 14 may become an obstacle when the marine vessel comes alongside the pier, and it is therefore preferable that the bow portion or the stern portion be formed in a concave shape as shown in FIG. 13, or that the fins 14 be mounted in a protected manner as shown in FIG. 14. They may also be mounted on the bottom of the marine vessel.

Figure 16:
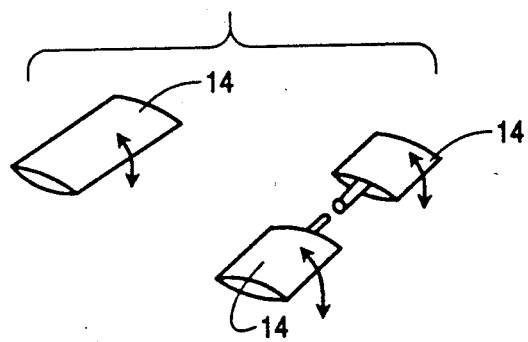
FIG. 16 shows another embodiment for providing a fin.

In this way, by determining the travel direction using a rudder and by preventing rolling and pitching using a stable wing or fin 14, seasickness of the crew and passengers can be greatly reduced. This fin may be formed into a wing-like shape and may also be attached with a flapper. Alternately, as shown in FIG. 16, the number of stable wings of either the bow or stern may be limited to one, so that the attitude control can be performed according three axes.

As described above, the attitude control of a marine vessel is performed such that stability control is carried out according to three or four axes and direction control is carried out according to one axis. By such 4 or 5 axis control using a hydraulic system, there can be obtained an attitude control system which is energy saving and rapid in response. In the same manner, the attitude control of a hydrofoil craft can be performed.

Figure 17:
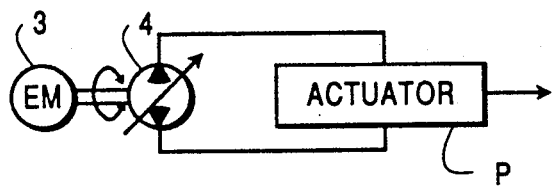
FIG. 17 is a schematic diagram of a hydraulic circuit according to the present invention.

Although there has been thus far described a device in which, as shown in FIG. 17, a hydraulic pump is driven by an electric motor and the hydraulic pump and the actuator are interconnected by two pipings. Such an arrangement merely depicts a basic example, and the same operation and effect can be obtained by a modified embodiment as described below.

Figure 18:
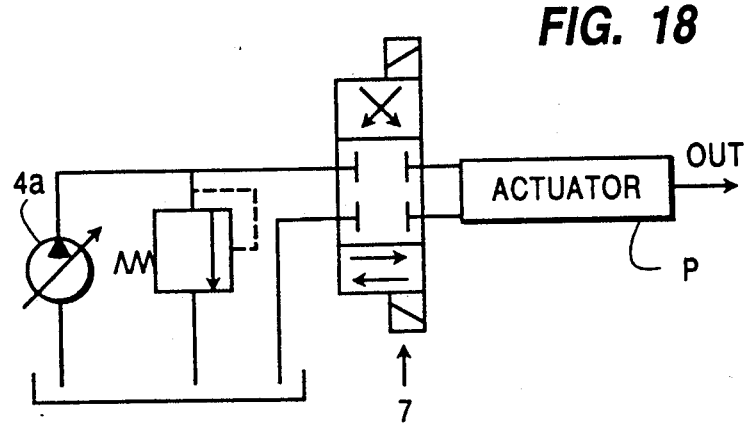
FIG. 18 is a schematic diagram of another hydraulic circuit according to the present invention.

That is, as shown in FIG. 18, a one-way type hydraulic pump 4a may be combined with a direction switching value 7 whereby the oil rate is determined by the speed of rotation of the hydraulic pump 4a, and the flow direction is determined by the switching valve 7.

The hydraulic pump 4 used in any of the above-mentioned embodiments may be of a fixed delivery type or a variable delivery type. In the case where a variable delivery type pump is used, the range of fluctuation of the oil flow rate can exceed the range of the speed of rotation of its power source. Regarding the electric motor, the servo amplifier 2 and the servo 3 may be combined with each other to control the speed of rotation and direction of the motor. However, such can be replaced with an inverter and an alternating current induced motor with the same effect. Moreover, instead of an electric motor, a power source, such as an internal combustion engine, an external combustion engine or the like, may be used. In this case, the speed of rotation, output, etc. of the power source are controlled by detecting the momentum (displacement, angle of rotation, speed, acceleration, etc.) of a mechanical output of the actuator and by feeding the detecting data back to the adder.

The attitude control device of an air or sea transportation vehicle, such as an air craft, according to the present invention as mentioned above, provides for the following effects.

That is, the hydraulic pressure portion is so simple that the hydraulic pump and the actuator are interconnected merely by two pipings. Added thereto are a bypass valve, a discharge valve, a relief valve, etc. which are adapted only for the purpose of safety. In the case where the hydraulic pump and the actuator are integrally formed, these pipings can be also be omitted.

As will be understood with reference to the hydraulic circuit, no element for lowering the efficiency, caused by a servo valve, etc., can be found. The efficiency of a single unit of the hydraulic pump and the efficiency of a single unit of the actuator remain as a small problem yet to be solved. It is said that the efficiencies of a pump and an actuator are 90% respectively. Therefore, the efficiency of the hydraulic pressure portion would be 81%, even when the conventional hydraulic components are combined, presuming that the resistance of the pipings is disregarded. Therefore, the fact that energy efficiency for the use of the attitude control in order to maintain the safety of the air craft is drastically improved, indicates that additional fuel can be loaded on the air craft, which naturally increases the flying distance.

The present invention is, of course, in no way restricted to the specific disclosure of the specification and drawings, but also encompasses any modifications within the scope of the appended claims.

I claim:

1. In an attitude control system for controlling a plurality of attitude control devices which cooperate to establish the attitude of a vehicle, the attitude control system including at least one control unit outputting attitude control signals to each of the attitude control devices, the improvement comprising:

a plurality of discrete power servo units located in proximity to and operatively coupled to at least one of the plurality of attitude control devices;

communication means for operatively connecting the at least one control unit said plurality of discrete power servo units so as to apply the attitude control signals to said plurality of discrete power servo units;

each of said discrete power servo units comprising (a) an adder means for summing an attitude control signal and a positional feedback signal and for outputting a corresponding added signal, (b) rotational drive means for providing a rotational drive source in accordance with the added signal output by said adder means, (c) a fluid pressure circuit comprising a fluid pressure pump for pumping a fluid in at least one flow direction in accordance with the rotational drive source of said rotational drive means, a fluid pressure actuator for actuating in response to the fluid pumped by said fluid pressure pump, and a fluid communication means for providing a closed-loop fluid path between said fluid pressure pump and said fluid pressure actuator, (d) means for operatively coupling said fluid pressure actuator to one of said attitude control devices, and (e) position detecting means for detecting a position of the attitude control device operatively coupled to said fluid pressure actuator.

2. In an attitude control system as recited in claim 1, wherein each of said discrete power servo units further comprises a converting means, coupled to said adder means, for converting optical signals into electrical signals, and wherein said communication means includes optical fibers connecting the at least one control unit to said converting means of each of said discrete power servo units.

3. In an attitude control system as recited in claim 1, wherein said fluid pressure actuator operates to generate a rotational motion for controlling the attitude control device operatively coupled thereto, and wherein said position detection means is a rotational position sensor for detecting a rotational position of the rotational motion generated by said fluid pressure actuator.

4. In an attitude control system as recited in claim 2, wherein said fluid pressure actuator operates to generate a rotational motion for controlling the attitude control device operatively coupled thereto, and wherein said position detection means is a rotational position sensor for detecting a rotational position of the rotational motion generated by said fluid pressure actuator.

5. In an attitude control system as recited in claim 1, wherein said fluid pressure actuator operates to generate a linear motion for controlling the attitude control device operatively coupled thereto, and wherein said position detection means is a linear position sensor for detecting a linear position of the linear motion generated by said fluid pressure actuator.

6. In an attitude control system as recited in claim 2, wherein said fluid pressure actuator operates to generate a linear motion for controlling the attitude control device operatively coupled thereto, and wherein said position detection means is a linear position sensor for detecting a linear position of the linear motion generated by said fluid pressure actuator.

7. In an attitude control system as recited in claim 1, wherein said fluid pressure pump includes one of (a) a two-way fluid pressure pump, and (b) a one-way fluid pressure pump coupled to a fluid directional flow valve.

8. In an attitude control system as recited in claim 2, wherein said fluid pressure pump includes one of (a) a two-way fluid pressure pump, and (b) a one-way fluid pressure pump coupled to a fluid directional flow valve.

9. In an attitude control system as recited in claim 1, wherein the vehicle is an air craft, and wherein the attitude control devices are flaps.

10. In an attitude control system as recited in claim 2, wherein the vehicle is an air craft, and wherein the attitude control devices are flaps.

11. In an attitude control system as recited in claim 3, wherein the vehicle is an air craft, and wherein the attitude control devices are flaps.

12. In an attitude control system as recited in claim 5, wherein the vehicle is an air craft, and wherein the attitude control devices are flaps.

13. In an attitude control system as recited in claim 1, wherein the vehicle is a helicopter, and wherein the attitude control devices are link mechanisms of a rotor.

14. In an attitude control system as recited in claim 2, wherein the vehicle is a helicopter, and wherein the attitude control devices are link mechanisms of a rotor.

15. In an attitude control system as recited in claim 3, wherein the vehicle is a helicopter, and wherein the attitude control devices are link mechanisms of a rotor.

16. In an attitude control system as recited in claim 5, wherein the vehicle is a helicopter, and wherein the attitude control devices are link mechanisms of a rotor.

17. In an attitude control system as recited in claim 1, wherein the vehicle is a marine vessel, and wherein each of the attitude control devices is one of a rudder and a fin.

18. In an attitude control system as recited in claim 2, wherein the vehicle is a marine vessel, and wherein each of the attitude control devices is one of a rudder and a fin.

19. In an attitude control system as recited in claim 3, wherein the vehicle is a marine vessel, and wherein each of the attitude control devices is one of a rudder and a fin.

20. In an attitude control system as recited in claim 5, wherein the vehicle is a marine vessel, and wherein each of the attitude control devices is one of a rudder and a fin.

* * * * *